(12) United States Patent
Hunt et al.

(10) Patent No.: US 9,922,200 B2
(45) Date of Patent: Mar. 20, 2018

(54) SECURELY STORING CONTENT WITHIN PUBLIC CLOUDS

(71) Applicant: MICROSOFT TECHNOLOGY LICENSING, LLC, Redmond, WA (US)

(72) Inventors: Galen Clyde Hunt, Bellevue, WA (US); Mark Eugene Russinovich, Clyde Hill, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 209 days.

(21) Appl. No.: 14/319,969

(22) Filed: Jun. 30, 2014

(65) Prior Publication Data

US 2015/0379297 A1   Dec. 31, 2015

(51) Int. Cl.
*G06F 21/00* (2013.01)
*G06F 21/62* (2013.01)
(Continued)

(52) U.S. Cl.
CPC .......... *G06F 21/6218* (2013.01); *G06F 21/10* (2013.01); *H04L 9/08* (2013.01); *H04L 63/0442* (2013.01); *H04L 63/062* (2013.01)

(58) Field of Classification Search
CPC . G06F 21/10; G06F 21/6218; H04L 63/0428; H04L 9/08; H04L 63/0442; H04L 63/062; H04N 21/4405
(Continued)

(56) References Cited

U.S. PATENT DOCUMENTS 8,705,746 B2\* 4/2014 Meijer ................ G06F 21/6245
380/279
8,732,471 B2\* 5/2014 Numaoka ............... G06F 21/10
713/150

(Continued)

OTHER PUBLICATIONS

"International Search Report & Written Opinion Issued in PCT Application No. PCT/US2015/038204", dated Sep. 4, 2015, 9 Pages.

(Continued)

*Primary Examiner* — Samson Lemma
*Assistant Examiner* — Narciso Victoria
(74) *Attorney, Agent, or Firm* — Shook, Hardy & Bacon, L.L.P.

(57) ABSTRACT

Systems, methods, and computer-readable storage media are provided for securely storing and accessing content within a public cloud. A processor manufacturer provides processors having secure enclave capability to a cloud provider. The provider makes available a listing of processor identifiers (CPUIDs) for processors available for storing content and having secure enclave capability. A content owner provides CPUIDs for desired processors from the listing to the manufacturer which provides the content owner with a processor-specific public code encryption key (CEK) for encrypting content to be stored on each processor identified. Each processor is constructed such that content encrypted with the public CEK may only be decrypted within a secure enclave thereof. The content owner encrypts the desired content with the public CEK and returns the encrypted content and the CPUID for the appropriate processor to the cloud provider. The cloud provider then stores the encrypted content on the particular processor.

9 Claims, 5 Drawing Sheets

(51) Int. Cl.
H04L 9/08 (2006.01)
H04L 29/06 (2006.01)
G06F 21/10 (2013.01)

(58) Field of Classification Search
USPC .......................................................... 726/26
See application file for complete search history.

(56) References Cited

U.S. PATENT DOCUMENTS

| | | | |
|---|---|---|---|
| 8,972,746 B2* | 3/2015 | Johnson | G06F 12/1466 713/189 |
| 2012/0084562 A1 | 4/2012 | Farina et al. | |
| 2012/0159184 A1 | 6/2012 | Johnson et al. | |
| 2012/0266167 A1 | 10/2012 | Spiers et al. | |
| 2012/0266252 A1* | 10/2012 | Spiers | H04L 63/0218 726/26 |
| 2013/0151846 A1 | 6/2013 | Baumann et al. | |
| 2013/0152209 A1 | 6/2013 | Baumann et al. | |
| 2013/0232345 A1 | 9/2013 | Johnson et al. | |
| 2013/0333005 A1 | 12/2013 | Kim et al. | |
| 2015/0058629 A1* | 2/2015 | Yarvis | H04L 63/0442 713/171 |
| 2015/0186657 A1* | 7/2015 | Nakhjiri | H04L 63/06 713/155 |
| 2015/0365385 A1* | 12/2015 | Hore | H04L 63/0428 713/152 |

OTHER PUBLICATIONS

"Thoughts on Intel's upcoming Software Guard Extensions (Part 2)", Published on: Sep. 23, 2013, 8 pages. Available at: http://sec.soup.io/post/348921006/Thoughts-on-Intels-upcoming-Software-Guard-Extensions.

Karthik, et al., "A Secure Access Code Technique for Remote Data Integrity on Public Cloud", In International Journal of Computer Applications, vol. 77, Issue14, Sep. 2013, 6 pages.

Masti, et al.,"An Architecture for Concurrent Execution of Secure Environments in Clouds Execution", In Proceedings of in the ACM Cloud Computing Security Workshop , Nov. 8, 2013, 12 pages.

McKeen, et al., "Innovative Instructions and Software Model for Isolated Execution" In Proceedings of the 2nd International Workshop on Hardware and Architectural Support for Security and Privacy, Jun. 24, 2013, 8 pages.

"What Is Apple's New Secure Enclave And Why Is It Important?", Published on: Sep. 18, 2013, 5 pages Available at: http://www.forbes.com/sites/quora/2013/09/18/what-is-apples-new-secure-enclave-and-why-is-it-important/2/.

Karme, Anil, "Building YOURcloud: The Federal Government's first Secure Hybrid Community Cloud)", Retrieved on: Oct. 30, 2013, 39 pages. Available at: http://www.govmarkcouncil.com/presentations/event112912/Anil_Karmel.pdf.

Sedayao, Jeff, "Enhancing Cloud Security Using Data Anonymization", In white Paper of Intel, Jun. 2012, 8 pages.

"Safenet Hardware Security Modules", Retrieved on Oct. 31, 2013, 8 pages. Available at: http://www.safenet-inc.com/products/data-protection/hardware-security-modules-hsms/.

"AWS CloudHSM", Retrieved on Oct. 28, 2013, 5 pages. Available at: http://aws.amazon.com/cloudhsm/.

"Second Written Opinion Issued in PCT Application No. PCT/US2015/038204", dated May 13, 2016, 5 Pages.

"International Preliminary Report on Patentability Issued in PCT Application No. PCT/US2015/038204", dated Sep. 19, 2016, 6 Pages.

* cited by examiner

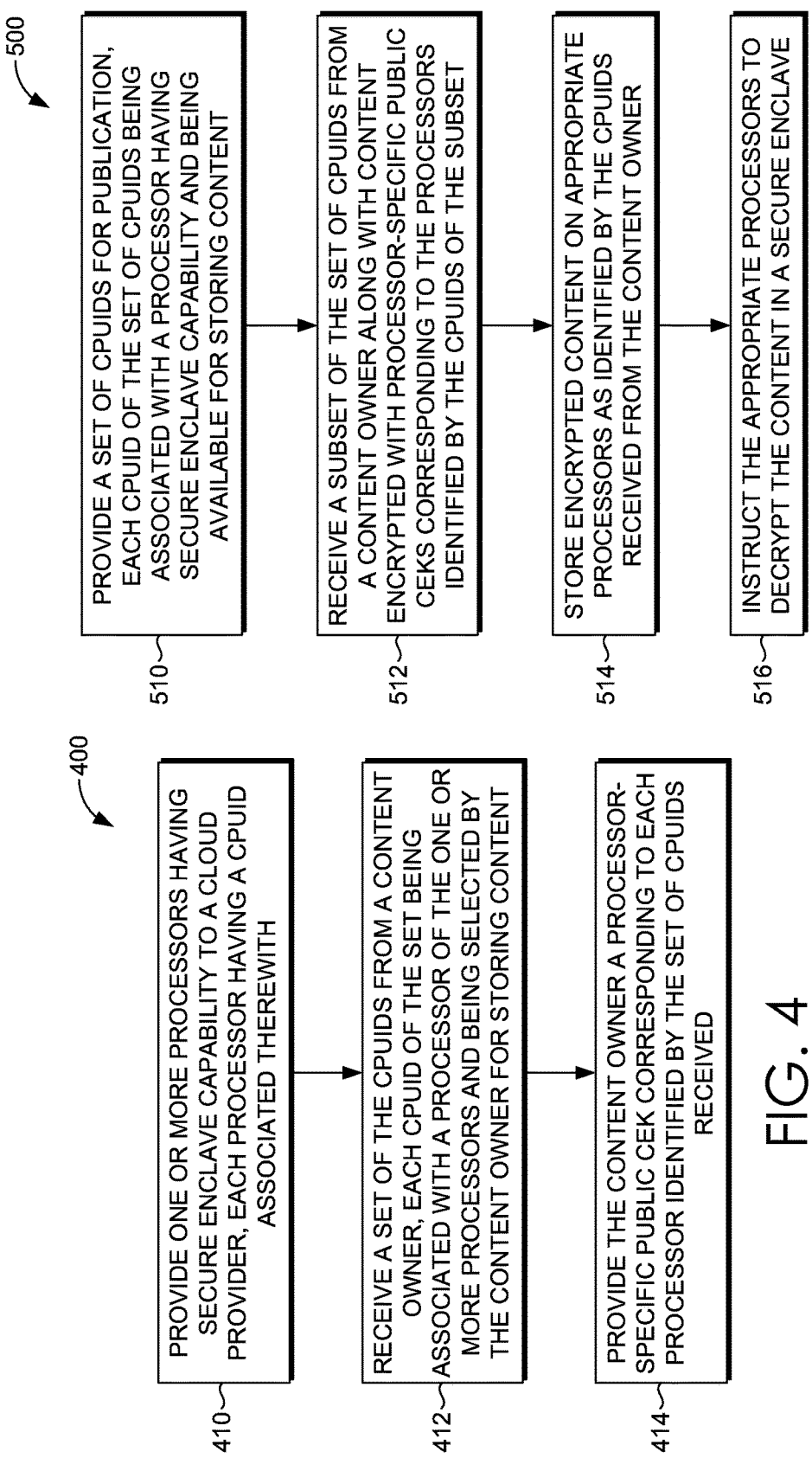

100
SECURELY STORING CONTENT WITHIN PUBLIC CLOUDS

BACKGROUND

Perhaps the biggest barrier to public cloud adoption is concern over the security of corporate secrets and customer data. A cloud provider's reputation, its track record of secure operations, and third-party certifications still require content owners to make leaps of faith when storing and accessing sensitive passwords, encryption keys, and data in a public cloud. Even current Hardware Security Module (HSM) offerings require customers to trust the cloud software vendor and operator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for securely storing and accessing content within a public cloud. A processor manufacturer provides processors having secure enclave capability to a cloud provider. The cloud provider makes available a listing of processor identifiers (CPUIDs) for its processors that have secure enclave capability and are available for storing content. A content owner accesses the listing and provides the CPUIDs for one or more of the processors from the listing to the processor manufacturer. The processor manufacturer then provides the content owner with a processor-specific public code encryption key (public CEK) for each particular processor identified by the one or more CPUIDs. The processor-specific public CEK may be utilized to encrypt content stored in association with the corresponding processor. Each particular processor includes the processor-specific private code encryption key (private CEK) corresponding to the provided public CEK and, by design, is constructed such that content encrypted with the public CEK may only be decrypted within a secure enclave of the processor utilizing the private CEK. The content owner encrypts the desired content with the public CEK and returns, to the cloud provider, the encrypted content and the CPUID for the particular processor corresponding to the processor-specific public CEK used to create the encrypted content. The cloud provider then stores the encrypted content in association with the particular processor.

Embodiments of the present invention provide a public cloud offering for content owner secret storage and access within a cloud that alleviates the need to trust cloud software vendors, cloud operators and cloud administrators.

BRIEF DESCRIPTION OF THE DRAWINGS

The present invention is illustrated by way of example and not limitation in the accompanying figures in which like reference numerals indicate similar elements and in which:

FIG. 4 is a flow diagram showing an exemplary method for securely storing and accessing content within a public cloud, taken from the perspective of a processor manufacturer (e.g., Intel® Corporation of Santa Clara, Calif.), in accordance with an embodiment of the present invention;

FIG. 5 is a flow diagram showing an exemplary method for securely storing and accessing content within a public cloud, taken from the perspective of a cloud provider (e.g., Microsoft Corporation of Redmond, Wash.), in accordance with an embodiment of the present invention.

DETAILED DESCRIPTION

Figure 1:
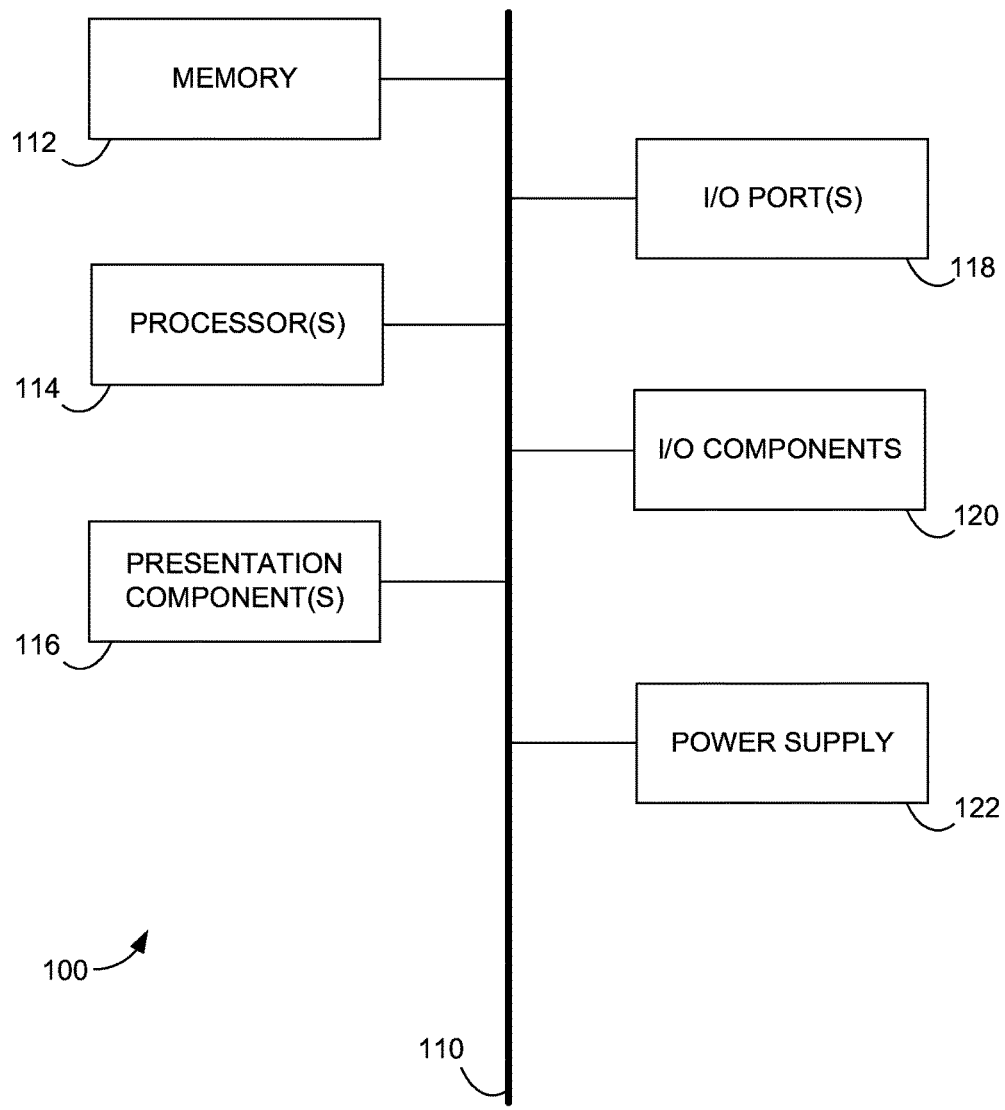
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for securely storing and accessing content within a public cloud. A processor manufacturer, e.g., Intel® Corporation of Santa Clara, Calif., provides processors having secure enclave capability to a cloud provider, for instance, to Microsoft Corporation of Redmond Wash. "Secure enclave capability," as the term is utilized herein, refers to the ability to create an area within the memory of a computing device, e.g., a processor, where special protections and access controls are utilized to secure information resources. The code and data within a secure enclave is protected from all code and data outside the secure enclave—even code and data on the same processor. By way of example only, one processor having secure enclave capability that may be utilized with embodiments of the present invention is the Intel® SGX (Software Guard Extensions) offered by Intel® Corporation of Santa Clara, Calif. It will be understood by those of ordinary skill in the art that embodiments hereof are not limited to use with the Intel® SGX but that other hardware implementations from other processor manufacturers may be utilized.

The cloud provider makes available a listing of processor identifiers (CPUIDs) for its processors that have secure enclave capability and are available for storing content. A content owner (that is, any party desiring to securely store and access content within the cloud) provides the CPUIDs for one or more of the processors from the listing to the processor manufacturer. The processor manufacturer then provides the content owner with a processor-specific public code encryption key (public CEK) for each processor associated with the one or more CPUIDs that may be utilized to encrypt content stored in association with the particular processors identified by each of the one or more CPUIDs. Each particular processor includes a processor-specific private code encryption key (private CEK) corresponding to the provided public CEK and, by design, is constructed such that content encrypted with the public CEK may only be decrypted by the private CEK within a secure enclave of the processor.

The content owner encrypts the desired content with the public CEK and returns, to the cloud provider, the encrypted content and the CPUID for the particular processor corresponding to the processor-specific public CEK used to create the encrypted content. The cloud provider then stores the encrypted content in association with the particular processor.

Accordingly, one embodiment of the present invention is directed to a method being performed by one or more computing devices including at least one processor, the method for securely storing and accessing content within the public cloud. The method includes providing one or more processors having secure enclave capability, each processor having a CPUID associated therewith; receiving a set of the CPUIDs, each CPUID of the set being associated with a processor of the one or more processors and having been selected for storing content; and providing a processor-specific public CEK corresponding to each processor identified by the set of CPUIDs received.

In another embodiment, the present invention is directed to a method being performed by one or more computing devices including at least one processor, the method for securely storing and accessing content within the public cloud. The method includes receiving a set of CPUIDs, each CPUID of the set having secure enclave capability and being available for storing content. The method further includes identifying at least a subset of the set of CPUIDs, each CPUID of the subset being associated with a processor selected for storing content. Still further, the method includes receiving a processor-specific public CEK corresponding to each processor associated with the subset of CPUIDs, encrypting content desired for storing on each processor selected for storing content with the received processor-specific public CEK corresponding thereto, and providing the encrypted content for storing along with the CPUID associated with the processor corresponding to the processor-specific public CEK utilized to encrypt the encrypted content provided.

In yet another embodiment, the present invention is directed to a system including a secure storing management engine having one or more processors and one or more computer-readable storage media and a data store coupled with the secure storing management engine. The secure storing management engine is configured to provide a set of CPUIDs for publication, each CPUID of the set of CPUIDs being associated with a processor having secure enclave capability and being available for storing content. The secure storing management engine further is configured to receive a subset of the set of CPUIDs along with content encrypted with processor-specific public CEKs corresponding to the processors identified by the CPUIDs of the subset, and to store the encrypted content on appropriate processors as identified by the CPUIDs received along with the encrypted content.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures, voice, or other physiological inputs generated by a user. These inputs may be interpreted as search requests, words or symbols appearing in apps available for retrieval in response to input search requests, and the like presented by the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

Furthermore, although the term "secure storing management engine" is used herein, it will be recognized that this term may also encompass servers, web browsers, sets of one or more processes distributed on one or more computers, one or more stand-alone storage devices, sets of one or more other computing or storage devices, any combination of one or more of the above, and the like.

As previously set forth, embodiments of the present invention provide systems, methods, and computer-readable storage media for securely storing and accessing content within the public cloud. To be truly secure, a content owner's code must be encrypted so that a cloud provider or cloud operator cannot tamper with it before it's launched into a secure enclave. The encryption key, referred to herein as the "code encryption key (CEK)," must be stored in the trusted hardware where the cloud operator cannot retrieve it, but the CEK cannot be generated by the cloud operator, nor sent in plaintext to the cloud operator by the content owner, since both would introduce a trust dependency on the cloud operator. This key provisioning bootstrapping problem is addressed by embodiments hereof by leveraging a third-party (e.g., the processor manufacturer or a third party associated with the processor manufacturer) that is trusted by both the content owner and the cloud operator.

There are numerous flows possible for the provisioning bootstrap. One example starts with the processor manufacturer seeding each processor with a private CEK (the Processor Key Pair (PKP)) at the time of manufacture that has usage restricted to launching secure enclaves. The processor manufacturer then makes the public CEK of the PKP available for retrieval by content owners via an API that uses the processor's unique CPUID as the index. The cloud operator makes the CPUID available for the processor on which it will host a content owner's secure enclave to the content owner, enabling the content owner to use the PKP's public CEK. In embodiments, a mutually-trusted third-party may be utilized to provision a new encryption PKP, removing ongoing trust in the processor manufacturer's key provisioning process. When the content owner submits the encrypted code and data, it cannot be read or tampered with by the cloud operator, and it will only launch into a secure enclave on the processor that the content owner intended.

Figure 2:
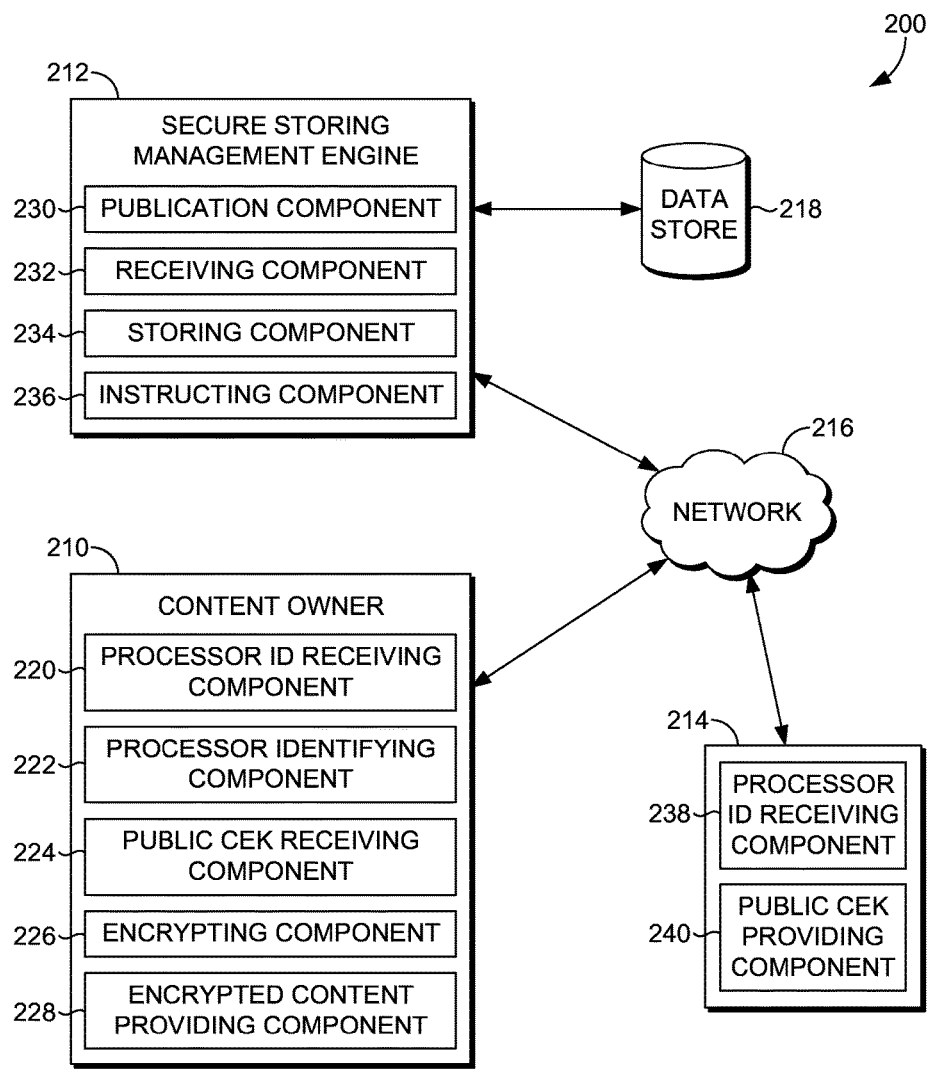
FIG. 2 is a block diagram of an exemplary computing system in which embodiments of the invention may be employed.

With reference to FIG. 2, a block diagram is provided illustrating an exemplary computing system 200 in which embodiments of the present invention may be employed. Generally, the computing system 200 illustrates an environment in which content may be securely encrypted for storing and accessing within the public cloud such that concerns regarding cloud provider and/or operator access may be alleviated. Among other components not shown, the computing system 200 generally includes a content owner computing device 210, a secure storing management engine 212 (operated by a cloud provider), and a computing device 214 operated by a processor-specific public code encryption key (public CEK) provider, all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

It should be understood that any number of content owner computing devices, secure storing management engines, and/or computing devices operated by processor-specific public CEK providers may be employed in the computing system 200 within the scope of embodiments of the present invention. Each may comprise a single device/interface or multiple devices/interfaces cooperating in a distributed environment. For instance, the secure storing management engine 212 may comprise multiple devices and/or modules arranged in a distributed environment that collectively provide the functionality of the secure storing management engine 212 described herein. Additionally, other components or modules not shown also may be included within the computing system 200.

In some embodiments, one or more of the illustrated components/modules may be implemented as stand-alone applications. In other embodiments, one or more of the illustrated components/modules may be implemented via the content owner computing device 210, the secure storing management engine 212, the computing device 214 operated by the processor-specific public CEK provider, or as an Internet-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of content owner computing devices, secure storing management engines, and/or devices operated by processor-specific public CEK providers. By way of example only, the secure storing management engine 212 might be provided as a single computing device (as shown), a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown and/or described, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The content owner computing device 210 may include any type of computing device, such as the computing device 100 described with reference to FIG. 1, for example. It should be noted that embodiments of the present invention are equally applicable to mobile computing devices and devices accepting gesture, touch and/or voice input. Any and all such variations, and any combination thereof, are contemplated to be within the scope of embodiments of the present invention. The content owner computing device 210 is configured to, among other things, permit a content owner to receive identifiers for processors available for storing content and having secure enclave capability, receive public CEKs for encrypting high-value content (e.g., SSL certificates, data encryption keys, account passwords, and sensitive business and customer data) or any other content which the content owner desires to protect, encrypt content utilizing processor-specific public CEKs, and provide encrypted content for storage and access within the public cloud. In this regard, the content owner computing device 210 generally includes a processor identification receiving component 220, a processor identifying component 222, a processor-specific public CEK receiving component 224, an encrypting component 226, and an encrypted content providing component 228.

The processor identification receiving component 220 is configured to receive, e.g., from a cloud provider, a set of CPUIDs corresponding to processors that have secure enclave capability and that are available for storing content. As more fully described below, the set of CPUIDs may be published by a cloud provider or may be otherwise made available by the cloud provider for publication and access by content owners. The processor identifying component 222 is configured to provide a subset of the CPUIDs to the computing device 214 operated by the public CEK provider. As more fully described below, the computing device 214 operated by the public CEK provider may be operated by the manufacturer of the processors corresponding to the CPUIDs of the subset or may be a third party associated with the manufacturer of the processors corresponding to the CPUIDs of the subset. Any and all such variations, and any combination thereof, are contemplated to be within the scope of embodiments of the present invention. The subset includes CPUIDs corresponding to processors selected by the content owner for storing and accessing content.

The public CEK receiving component 224 is configured to receive, from the computing device 214 operated by the public CEK provider, a public CEK specific to each processor identified by the subset of CPUIDs. The encrypting component 226 is configured to encrypt content desired to be stored and accessed within a particular processor identified by the subset of CPUIDs with the public CEK specific to that particular processor. For instance, if the content owner desires to encrypt two packets of information, a first to be stored and accessed within CPUID A and a second to be stored and accessed within CPUID B, the encrypting component 226 is configured to encrypt the first packet with the public CEK specific to the processor identified by CPUID A and to encrypt the second packet with the public CEK specific to the processor identified by CPUID B.

The encrypted content providing component 228 is configured to provide the content encrypted with the appropriate processor-specific public CEKs to the cloud provider, along with the CPUID for the processor corresponding to the public CEK utilized to encrypt each packet of content. The cloud provider may then store the encrypted content on the appropriate secure processor within the cloud, as more fully described below.

The secure storing management engine 212 of the computing system 200 of FIG. 2 may include any type of computing device, such as the computing device 100 described with reference to FIG. 1, for example, and is configured to, among other things, provide processor identifiers for secure processors available for storing content, and to receive and store encrypted content in association with appropriate secure processors. As illustrated, the secure storing management engine 212 has access to a data store 218. The data store 218 is configured to store information related to at least secure processor identifiers and space availability for storage within its secure processors. In embodiments, the data store 218 is configured to be searchable for one or more of the items stored in association therewith. It will be understood and appreciated by those of ordinary skill in the art that the information stored in association with the data store may be configurable and may include any information relevant to, by way of example only, secure processors, processor availability, and the like. The content and volume of such information are not intended to limit the scope of embodiments of the present invention in any way. Further, the data store 218 may be a single, independent component (as shown) or a plurality of storage devices, for instance a database cluster, portions of which may reside in association with the secure storing management engine 212, another external computing device (not shown), and/or any combination thereof.

As illustrated, the secure storing management engine 212 of the computing system 200 of FIG. 2 includes a publication component 230, a receiving component 232, a storing component 234, and an instructing component 236. The publication component 230 is configured to publish a set of CPUIDs (or provide a set of CPUIDs for publication by a third party), each CPUID being associated with a processor having secure enclave capability and being available for storing content. Upon publication, the set of CPUIDs may be accessed by content owners desiring to securely store and access content in the public cloud, as more fully described herein.

The receiving component 232 is configured to receive content encrypted with appropriate processor-specific public CEKs, e.g., from a content owner. The receiving component 232 further is configured to receive the CPUIDs associated with the processors desired for storing the encrypted content, that is, the CPUIDs associated with the processors corresponding to the processor-specific public CEKs utilized to encrypt the encrypted content.

The storing component 234 is configured to store the received encrypted content on the appropriate processors as identified by the CPUIDs received. The instructing component 236 is configured to instruct the appropriate processors to decrypt the encrypted content in a secure enclave.

With continued reference to FIG. 2, the computing device 214 operated by the processor-specific public CEK provider may include any type of computing device, such as the computing device 100 described with reference to FIG. 1, for example. In embodiments, the processor-specific public CEK provider may be the manufacturer of the processors for which desired processor-specific public CEKs are associated. In other embodiments, the processor-specific public CEK provider may be a third party associated with the manufacturer of the processors for which desired processor-specific public CEKs are associated. The latter provides an additional level of security and further may alleviate concerns about data compromise. Any and all such variations, and any combination thereof, are contemplated to be within the scope of embodiments of the present invention.

The computing device 214 operated by the processor-specific public CEK provider is configured to, among other things, receive CPUIDs corresponding to processors on which secure content storing is desired and provide processor-specific public CEKs corresponding to the processors associated with the received CPUIDs. In this regard, the computing device 214 operated by the processor-specific public CEK provider includes a processor identifier receiving component 238 and a public CEK providing component 240. The processor identifier receiving component 238 is configured to receive a list of CPUIDs (for instance, from a content owner), each CPUID being associated with a secure processor on which the content owner desires to store content. The public CEK providing component 240 is configured to provide a processor-specific public CEK, at least one specific to the processor associated with each CPUID received from the content owner, the public key(s) for encrypting content to be stored in association with the appropriate processor.

Secure enclaves not only enable content owners to store and access secrets securely, but to securely execute code that leverages the secrets, making the code secret. Because secure enclaves are secure from access from anything else executing on the processor, including other secure enclaves, a cloud provider can choose to securely collocate different content owner secure enclaves on the same server. Being able to transparently migrate secure enclaves between processors is not just desirable to address hardware failure and decommission, but also to load balance and to provide high availability in the face of planned software and hardware maintenance. Encrypting code that will execute in a secure enclave with a single processor's key can interfere with the ability to migrate.

A scalable way for a cloud operator to enable migration is to publish the CPUIDs for the fleet of processors that can potentially host a content owner's secure enclaves. The content owner may generate a symmetric CEK outside the cloud and encrypt its code and data package using that CEK. Then it can create an array whose entries include a CPUID and the CEK encrypted with that processor's PKP public key. When it launches the secure enclave, the cloud provider's software running on a processor finds the appropriate entry using the CPUID and instructs the processor to first securely decrypt the CEK and then use that to decrypt the code and data into the secure enclave. Migration simply repeats the process with a different array entry.

This scheme serves the case where the fleet of processors is relatively static, but still requires the content owner to create new array entries when the cloud operator introduces new processors that can host secure enclaves. Using secure enclaves, though, the scheme can be extended so that the content owner's code will automatically produce packages for new processors. To support this capability, the content owner's code includes an interface that can be invoked by the cloud provider with the CPUID of the new processors that might host it. In response, the code securely connects to the processor manufacturer's (or mutually-trusted third-party that's provisioned a key in the processors) API to retrieve the PKP public keys for the corresponding processors. The encrypted code package the content owner uploads to the cloud provider includes its own CEK (encrypted within itself), so when it launches into a secure enclave, the code has secure access to its own CEK. This enable it to on-demand encrypt the CEK with PKP public keys for the additional servers, and return the encrypted code key to the cloud operator so that they can augment the code's array of encrypted CEKs.

Figure 3:
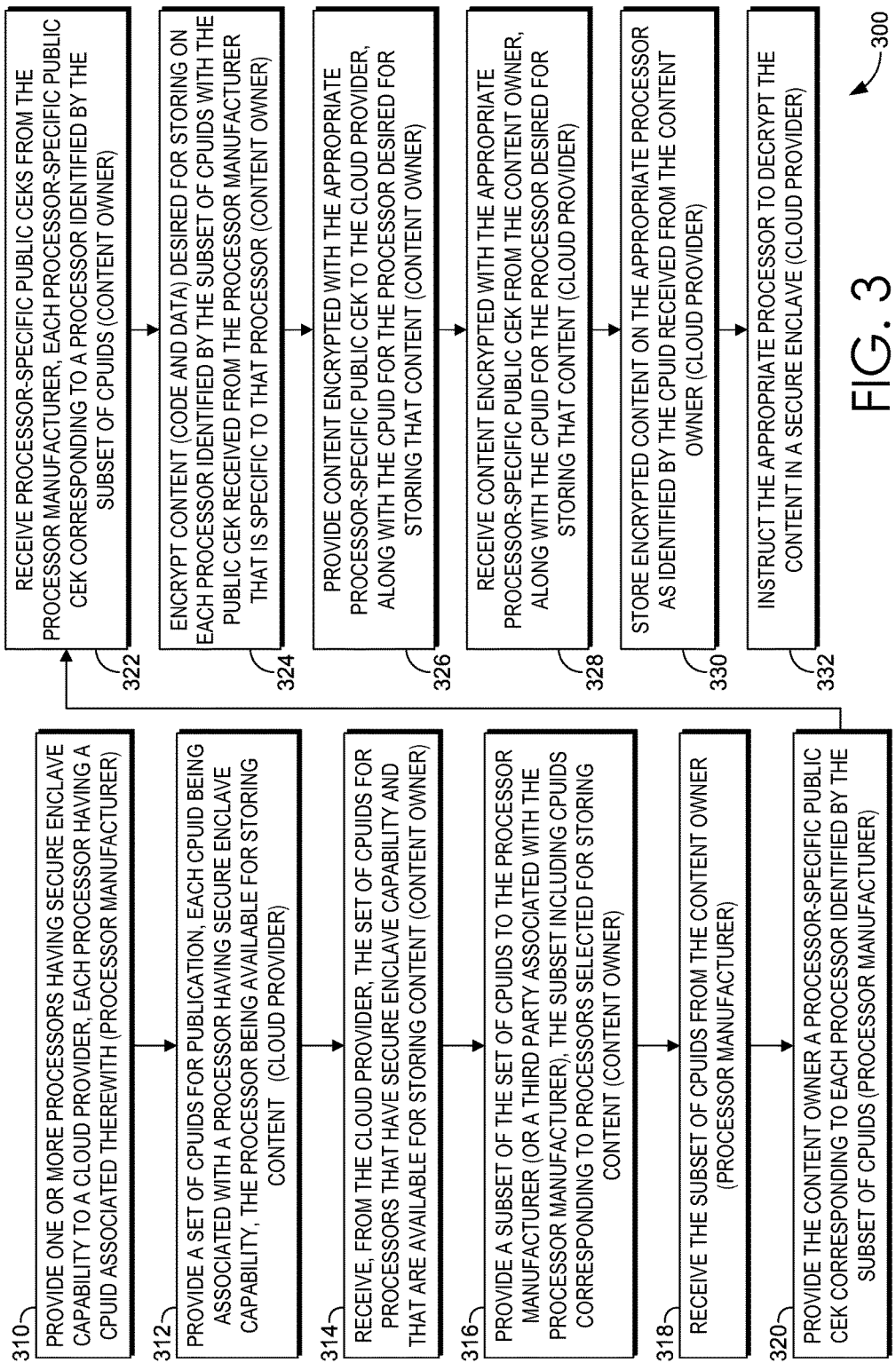
FIG. 3 is a flow diagram showing an exemplary method for securely storing and accessing content within a public cloud, in accordance with an embodiment of the present invention.

Turning now to FIG. 3, a flow diagram is illustrated showing an exemplary method 300 for securely storing and accessing content within the public cloud. As indicated at block 310, one or more processors are provided to a cloud provider, e.g., Microsoft Corporation of Redmond, Wash., by a processor manufacturer, e.g., Intel® Corporation of Santa Clara, Calif. Each provided processor includes secure enclave capability and includes a CPUID associated therewith. As indicated at block 312, the cloud provider either publishes or makes available for publication, a set of the CPUIDs, each CPUID associated with one of the processors provided by the processor manufacturer. Accordingly, each processor associated with a CPUID in the set of CPUIDs includes secure enclave capability. Each processor associated with a CPUID in the set of CPUIDs further is available for securely storing content. As indicated at block 314, a content owner (that is, anyone desiring to securely store and access content within the public cloud) receives the set of CPUIDs from the cloud provider (or associated publisher).

As indicated at block 316, a subset of the CPUIDs is identified by the content owner as being associated with processors on which it desires to have content securely stored, and the subset of CPUIDs is provided to the processor-specific public CEK provider. In embodiments, the processor-specific public CEK provider may be the manufacturer of the processors with which provided processor-specific public CEKs are associated. In other embodiments, the processor-specific public CEK provider may be a third party associated with the processor manufacturer. Any and all such variations, and any combination thereof, are contemplated to be within the scope of embodiments of the present invention. As indicated at block 318, the subset of CPUIDs is received from the content owner by the processor-specific public CEK provider.

The processor-specific public CEK provider provides, to the content owner, a processor-specific public CEK corresponding to each processor identified by the subset of CPUIDs. This is indicated at block 320. The processor-specific public CEKs are received by the content owner, as indicated at block 322. The content owner utilizes the received processor-specific public CEKs to encrypt content (code and data) that it desires to have securely stored in association with the secured processors identified by the subset of CPUIDs. Content intended for each processor identified by a CPUID of the subset of CPUIDs is encrypted with the public key specific to that processor. This is indicated at block 324. The encrypted content, along with the appropriate CPUID for the processor associated with the processor-specific public CEK utilized to encrypt the content, are provided to the cloud provider, as indicated at block 326.

The cloud provider receives the content encrypted with the appropriate processor-specific public CEK from the content owner, along with the CPUID for the processor desired for storing that content, as indicated at block 328. As indicated at block 330 the cloud provider stores the encrypted content on the appropriate processor as identified by the CPUID received from the content owner. In embodiments, the cloud provider further may instruct the appropriate processor to decrypt the content in a secure enclave, as indicated at block 332.

With reference now to FIG. 4, a flow diagram is illustrated showing another exemplary method 400 for securely storing and accessing content within the public cloud, this flow diagram being from the perspective of the processor manufacturer, in accordance with an embodiment of the present invention. As indicated at block 410, one or more processors having secure enclave capability are provided to a cloud provider (e.g., Microsoft Corporation of Redmond, Wash.). Each processor has a CPUID associated therewith. As indicated at block 412, a set of the CPUIDs is received (e.g., from a content owner), each CPUID in the set being associated with a processor that the content owner has selected for securely storing and accessing content. The content owner is provided a processor-specific public CEK corresponding to each processor identified by the set of CPUIDs received, as indicated at block 414.

Turning to FIG. 5, a flow diagram is illustrated showing another exemplary method 500 for securely storing content in the cloud, this flow diagram being from the perspective of the cloud provider, in accordance with an embodiment of the present invention. As indicated at block 510, a set of CPUIDs is published (or made available for publication), each CPUID of the set of CPUIDs being associated with a processor having secure enclave capability and being available for securely storing and accessing content in the public cloud. A subset of the set of published CPUIDs is received (e.g., from a content owner) along with content encrypted with processor-specific public CEKs corresponding to the processors identified by the CPUIDs of the subset. This is indicated at block 512. The encrypted content is stored on the appropriate processors as identified by the CPUIDs received, as indicated at block 514. In embodiments, the appropriate processors are instructed to decrypt the content in a secure enclave, as indicated at block 516.

Figure 6:
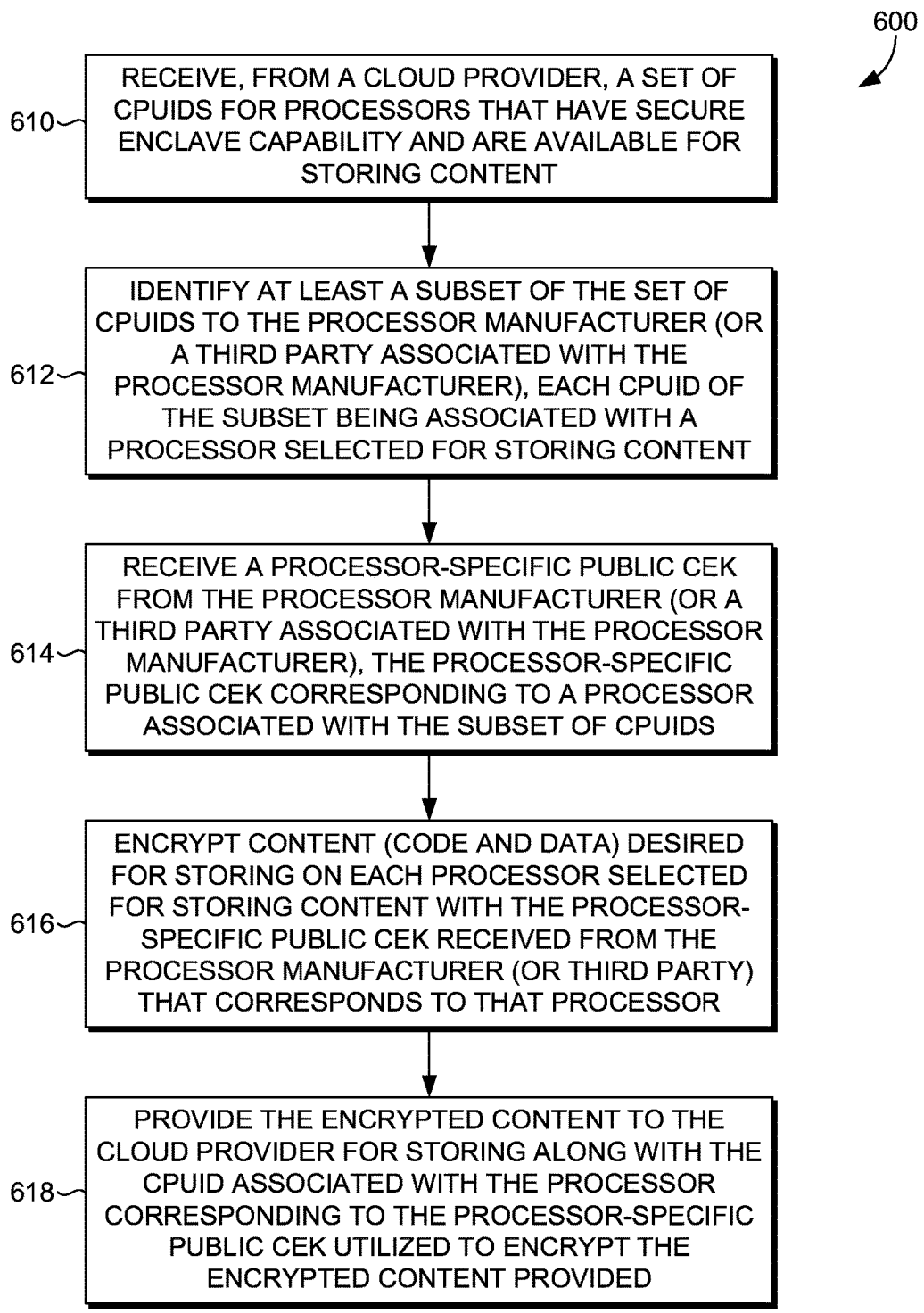
FIG. 6 is a flow diagram showing an exemplary method for securely storing and accessing content within the public cloud, taken from the perspective of a content owner (i.e., any party desiring to securely store and access content stored within a public cloud), in accordance with an embodiment of the present invention.

With reference to FIG. 6, a flow diagram is illustrated showing an exemplary method 600 for securely storing and accessing content within a public cloud, this flow diagram being from the perspective of the content owner, in accordance with an embodiment of the present invention. As indicated at block 610, a set of CPUIDs is received, from a cloud provider, for processors that have secure enclave capability and are available for securely storing and accessing content in a public cloud. As indicated at block 612, at least a subset of the set of CPUIDs is identified and provided to the processor manufacturer (or third party associated with the processor manufacturer), each processor identifier of the subset being associated with a processor selected for storing and accessing content in a public cloud. As indicated at block 614, a processor-specific public CEK is received from the processor manufacturer (or third party), the processor-specific public CEK corresponding to a processor associated with the subset of CPUIDs. The content (code and data) desired for storing on each processor selected for securely storing and accessing content is encrypted with the processor-specific public CEK that corresponds to that processor, as indicated at block 616. The encrypted content along with the CPUID associated with the processor corresponding to the processor-specific public CEK utilized to encrypt the encrypted content is provided to the cloud provider for storing on the appropriate processor. This is indicated at block 618.

As can be understood, embodiments of the present invention provide systems, methods, and computer-readable storage media for, among other things, securely storing and accessing content within a public cloud. A processor manufacturer provides processors having secure enclave capability to a cloud provider. The cloud provider makes available a listing of CPUIDs for its processors that have secure enclave capability and that are available for securely storing and accessing content within the public cloud. A content owner accesses the listing and provides the CPUIDs for one or more of the processors from the listing to the processor manufacturer. The processor manufacturer then provides the content owner with a processor-specific public CEK that may be utilized to encrypt content stored in association with each particular processor identified by the one or more CPUIDs. Each particular processor includes the private CEK corresponding to the provided public CEK and, by design, is constructed such that content encrypted with the public CEK may only be decrypted within a secure enclave of the processor. The content owner encrypts the desired content with the public CEK and returns, to the cloud provider, the encrypted content and the CPUID for the particular processor corresponding to the public CEK used to create the encrypted content. The cloud provider then stores the encrypted content in association with the particular processor.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 300 of FIG. 3, 400 of FIG. 4, 500 of FIG. 5 and 600 of FIG. 6 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. A method being performed by one or more computing devices including at least one hardware processor, the method for securely storing content, received from a content owner, in a cloud provided by a cloud provider, the method comprising:
   providing a set of processor identifiers accessible to the content owner, wherein each processor identifier of the set identifies a processor having secure enclave capability and being available for storing content, wherein each identified processor is a hardware processor, and wherein secure enclave capability comprises an ability to create an area within memory of a computing device for storing code and data that is protected from code and other data outside of the area;
   receiving, from the content owner, encrypted content and at least one selected processor identifier selected from the set, the encrypted content being encrypted using a processor-specific public key that corresponds to a processor that is identified by the at least one selected processor identifier;
   storing the encrypted content on the processor identified by the at least one selected processor identifier; and
   instructing the processor to decrypt the encrypted content in a secure enclave on the processor.

2. The method of claim 1, wherein providing a set of processor identifiers includes publishing a set of processor identifiers.

3. The method of claim 1, wherein the processor-specific public key is provided to a content provider for encrypting the encrypted content by a public key provider, wherein the public key provider is not the cloud provider.

4. The method of claim 1, wherein each of the processor-specific public key is associated with a processor-specific private key configured to decrypt the encrypted content.

5. A method being performed by one or more computing devices including at least one hardware processor, the method for securely storing content in a cloud, the method comprising:
   receiving, from a cloud provider, a set of processor identifiers, each processor identifier of the set being associated with a processor having secure enclave capability and being available for storing content, wherein each associated processor is a hardware processor, and wherein secure enclave capability comprises an ability to create an area within memory of a computing device for storing code and data that is protected from code and other data outside of the area;
   identifying one or more selected processor identifiers of the set of processor identifiers, each of the one or more selected processor identifiers being associated with a selected processor selected by the content owner for storing content;
   providing, to a manufacturer of the one or more selected processors or to a third party associated with the manufacturer, the one or more selected processor identifiers;
   receiving, from the manufacturer of the one or more selected processors or from the third party associated with the manufacturer, one or more processor-specific public keys, each of the one or more processor-specific public keys corresponding to the selected processor;
   encrypting content desired for storing on each selected processor with the received one or more processor-specific public keys corresponding thereto; and
   providing, to the cloud provider, the encrypted content for storing on each selected processor along with the one or more selected processor identifiers associated with the each selected processors.

6. The method of claim 5, wherein each of the one or more processor-specific public keys is associated with a processor-specific private key, wherein the processor-specific private key is configured to decrypt content encrypted with the processor-specific public key associated with the processor-specific private key.

7. A system comprising:
   a secure storing management engine having at least one hardware processor and a computer-readable storage device comprising computer executable instructions embodied thereon that when executed by the at least one hardware processor configure the system to:
   provide a set of processor identifiers for publication accessible by content owners, each processor identifier of the set of processor identifiers being associated with a processor having secure enclave capability and being available for storing content, wherein each associated processor is a hardware processor, wherein each associated processor includes a processor-specific private code encryption key (CEK) corresponding to a processor-specific public CEK, and wherein secure enclave capability comprises an ability to create an area within memory of a computing device for storing code and data that is protected from code and other data outside of the area;
   receive, from a content owner, a subset of the set of processor identifiers along with content encrypted with processor-specific public keys corresponding to the processors identified by the processor identifiers of the subset; and
   store the encrypted content on appropriate processors as identified by the processor identifiers received from the content owner with the encrypted content.

8. The system of claim 7, further configured to instruct the appropriate processors to decrypt the encrypted content in a secure enclave.

9. The system of claim 8, further configured to instruct the processor to decrypt the encrypted content in the secure enclave using a processor-specific private key that corresponds to the processor-specific public key.

* * * * *